(12) United States Patent
Huang

(10) Patent No.: US 8,917,048 B2
(45) Date of Patent: Dec. 23, 2014

(54) MOTOR CONTROL DEVICE AND MOTOR CONTROL METHOD

(71) Applicant: Delta Electronics, Inc., Taoyuan Hsien (TW)

(72) Inventor: Yueh-Lung Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 186 days.

(21) Appl. No.: 13/719,233

(22) Filed: Dec. 19, 2012

(65) Prior Publication Data

US 2013/0293177 A1 Nov. 7, 2013

(30) Foreign Application Priority Data

May 3, 2012 (TW) .............................. 101115704 A

(51) Int. Cl.
  *H02P 1/30* (2006.01)
  *H02P 27/16* (2006.01)
  *H02P 7/00* (2006.01)
  *H02P 7/29* (2006.01)

(52) U.S. Cl.
  CPC .............. *H02P 27/16* (2013.01); *H02P 7/0044* (2013.01); *H02P 7/29* (2013.01); *H02P 7/2913* (2013.01)

USPC ......................... 318/503; 318/400.1; 318/490

(58) Field of Classification Search
  USPC .......... 318/503, 400.01, 490, 400.13, 400.42, 318/400.17, 400.2, 400.3
  See application file for complete search history.

(56) References Cited

U.S. PATENT DOCUMENTS

2008/0243329 A1* 10/2008 Hamel et al. ................... 701/29

* cited by examiner

*Primary Examiner* — Karen Masih
(74) *Attorney, Agent, or Firm* — CKC & Partners Co., Ltd.

(57) ABSTRACT

A motor control device and a motor control method are disclosed herein, where the motor control device includes a signal conversion unit, a frequency multiplication unit, a profile generation circuit and a frequency converter unit. The signal conversion unit receives a rotation speed signal from a motor and converts the rotation speed signal into a digital signal. The frequency multiplication unit generates a frequency multiplication signal based on the digital signal. The profile generation circuit performs frequency division on the frequency multiplication signal to get a profile signal. The frequency converter unit generates a reference signal and compares the reference signal with the profile signal to output a motor control signal.

20 Claims, 12 Drawing Sheets

MOTOR CONTROL DEVICE AND MOTOR CONTROL METHOD

RELATED APPLICATIONS

This application claims priority to Taiwan Application Serial Number 101115704; filed May 3, 2012, which is herein incorporated by reference.

BACKGROUND

1. Technical Field

The present disclosure relates to control devices and control methods, and more particularly, motor control devices and motor control methods.

2. Description of Related Art

Conventional sinusoidal pulse-width modulation (SPWM) for driving motor is based on the comparison between a sinusoidal voltage command generated by a controller and a triangular wave. Specifically, the pulse width is controlled by comparing a reference signal with a carrier signal having a higher frequency, and thereby, the conducting or cut-off time of the power semiconductor in the inverter is determined. For example, during an SPWM modulation, a sinusoidal wave (Vs) is used as the reference signal, and a triangular wave (Vt) is used as the carrier wave; when Vs>Vt, a pulse-width modulation signal with a high logic level is generated; in contrast, when Vs<Vt, a pulse-width modulation signal with a low logic level is generated.

The implementation of the aforementioned SPWM modulation is quite simple; for example, an analog circuit may be used as a generation circuit for generating the triangular wave and the sinusoidal modulating wave; a comparator may be used to ascertain the crossover point of the two waves; and a SPWM wave could be generated by controlling the on/off state of the switch at the crossover time. However, such analog circuit is quite complex in structure, and therefore, is not feasible in achieving an accurate control.

In view of the foregoing, there still exist some inconveniences and defects in conventional motor-driving methods that await further improvement. However, those with skilled in the art sought vainly for a solution. In order to solve or circumvent above problems and disadvantages, there is an urgent need in the related field to provide a more accurate method for controlling motors.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one or more various aspects, the present disclosure is directed to a motor control device and a motor control method for being accurate at motor control in digital manner.

According to one embodiment of the present invention, a motor control device includes a signal conversion unit, a frequency multiplication unit, a profile generation circuit and a frequency converter unit. The signal conversion unit receives a rotation speed signal from a motor and converts the rotation speed signal into a digital signal. The frequency multiplication unit generates a frequency multiplication signal based on the digital signal. The profile generation circuit performs frequency division on the frequency multiplication signal to get a profile signal. The frequency converter unit generates a reference signal and compares the reference signal with the profile signal to output a motor control signal.

The signal conversion unit requires the rotation speed signal from north and south magnetic poles or a coil of the motor.

The frequency multiplication unit includes at least one frequency multiplier. The frequency multiplier sets a frequency of the frequency multiplication signal according to rotations per minute of the motor and further output the frequency multiplication signal.

The frequency multiplier includes a first timer, a first resistor, a first capacitor, a second resistor, a second capacitor, an inverter, a third resistor, a third capacitor, third capacitor and a second timer. The first timer is configured to receive a working voltage, and the first timer has an input terminal and an output terminal. The first resistor has a terminal configured to receive the working voltage and another terminal connected to the input terminal of the first timer. The first capacitor has a terminal for receiving the digital signal and another terminal connected to the input terminal of the first timer. The second resistor has a terminal configured to receive the working voltage and another terminal connected to the input terminal of the first timer. The second capacitor has a terminal connected to the input terminal of the first timer and another terminal that is grounded. The inverter has an input terminal connected to the output terminal of the first timer. The third resistor has a terminal connected to an output terminal of the inverter. The third capacitor has a terminal that is grounded and another terminal connected to another terminal of the third resistor. The second timer is configured to receive the working voltage, and the second timer has an input terminal and an output terminal, where the input terminal of the second timer is connected to another terminal of the third capacitor, and the output terminal of the second timer is configured to output the frequency multiplication signal.

The profile signal is a sinusoidal digital signal or a sinusoidal-like digital signal with at least 4-bit long.

The profile generation circuit includes an add-subtract counter, a first D-type flip-flop, a first inverter, a first logic gate circuit and a second logic gate circuit. The add-subtract counter receives the frequency multiplication signal. The first D-type flip-flop controls the add-subtract counter, so that the add-subtract counter can output a first output signal, a second output signal, a third output signal and a fourth output signal. The first inverter receives the first output signal and the second output signal and outputs a first inverted output signal and a second inverted output signal. The first logic gate circuit performs a first logic operation based on the first, second, third and fourth output signals and the first and second inverted output signals so as to output a fifth output signal. The second logic gate circuit performs a second logic operation based on the first, second, third and fourth output signals and the first and second inverted output signals so as to output a sixth output signal, wherein the second, fourth, fifth and sixth output signals serve as the sinusoidal digital signal or the sinusoidal-like digital signal with said at least 4-bit long.

The first logic gate circuit includes a first AND gate circuit and at least one first OR gate circuit. The first AND gate circuit receives the first, second, third and fourth output signals and the first and second inverted output signals. The first OR gate circuit is connected to the first AND gate circuit and outputs the fifth output signal.

The second logic gate circuit includes a second AND gate circuit and at least one second OR gate circuit. The second AND gate circuit receives the first, second, third and fourth output signals and the first and second inverted output signals.

The second OR gate circuit is connected to the first AND gate circuit and outputs the sixth output signal.

The frequency converter unit includes a clock generator, a synchronous counter, a magnitude comparator, a second D-type flip-flop and a second inverter. The clock generator generates a clock signal. The synchronous counter generates four counter output signals based on the clock signal, in which the counter output signals serve as the reference signal.

The magnitude comparator performs a comparison operation based on the counter output signals and the second, fourth, fifth and sixth output signals so as to output a co-sinusoidal PWM signal. The second D-type flip-flop outputs a sinusoidal PWM signal according to the co-sinusoidal PWM signal and the clock signal. The second inverter receives the sinusoidal PWM signal and outputs an inverted sinusoidal PWM signal, where the sinusoidal PWM signal and the inverted sinusoidal PWM signal serve as the motor control signal.

The clock generator is an inverting Schmitt trigger for generating an oscillation frequency as the clock signal.

The motor control device further includes a driving unit. The driving unit drives the motor according to the motor control signal.

The driving unit is a H-bridge driver circuit.

According to another embodiment of the present invention, a motor control method includes steps; (a) receiving a rotation speed signal from a motor and converting the rotation speed signal into a digital signal; (b) generating a frequency multiplication signal based on the digital signal; (c) performing frequency division on the frequency multiplication signal to get a profile signal; and (d) generating a reference signal and comparing the reference signal with the profile signal to output a motor control signal.

In the step (a), the rotation speed signal is required from north and south magnetic poles or a coil of the motor.

In the step (b), a frequency of the frequency multiplication signal is set according to rotations per minute of the motor, and the frequency multiplication signal is outputted.

The profile signal is a sinusoidal digital signal or a sinusoidal-like digital signal with at least 4-bit long.

In the step (c), an add-subtract counter is controlled so that the add-subtract counter outputs a first output signal, a second output signal, a third output signal and a fourth output signal; the first output signal and the second output signal are inverted to output a first inverted output signal and a second inverted output signal; a first logic operation based on the first, second, third and fourth output signals and the first and second inverted output signals is performed so as to output a fifth output signal; a second logic operation based on the first, second, third and fourth output signals and the first and second inverted output signals is performed so as to output a sixth output signal, where the second, fourth, fifth and sixth output signals serve as the sinusoidal digital signal or the sinusoidal-like digital signal with said at least 4-bit long.

In the step (d), a clock signal is generated; four counter output signals based on the clock signal are generated, in which the counter output signals serve as the reference signal; a comparison operation based on the counter output signals and the second, fourth, fifth and sixth output signals is performed so as to output a co-sinusoidal PWM signal; a sinusoidal PWM signal is outputted according to the co-sinusoidal PWM signal and the clock signal; the sinusoidal PWM signal is inverted to output an inverted sinusoidal PWM signal, wherein the sinusoidal PWM signal and the inverted sinusoidal PWM signal serve as the motor control signal.

The step of generating the clock signal includes that an inverting Schmitt trigger is utilized to generate an oscillation frequency as the clock signal.

The motor control method further includes a step of driving the motor according to the motor control signal.

Technical advantages are generally achieved, by embodiments of the present invention as follows:
1. The motor control device and method are accomplished at a lower cost to achieve low noise, low vibration and high efficiency;
2. Compared with the conventional SPWM, mass production can be achieved by the present invention and without complicated calculation; and
3. The motor control device and method can be integrated into a driver IC or a micro controller unit (MCU).

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
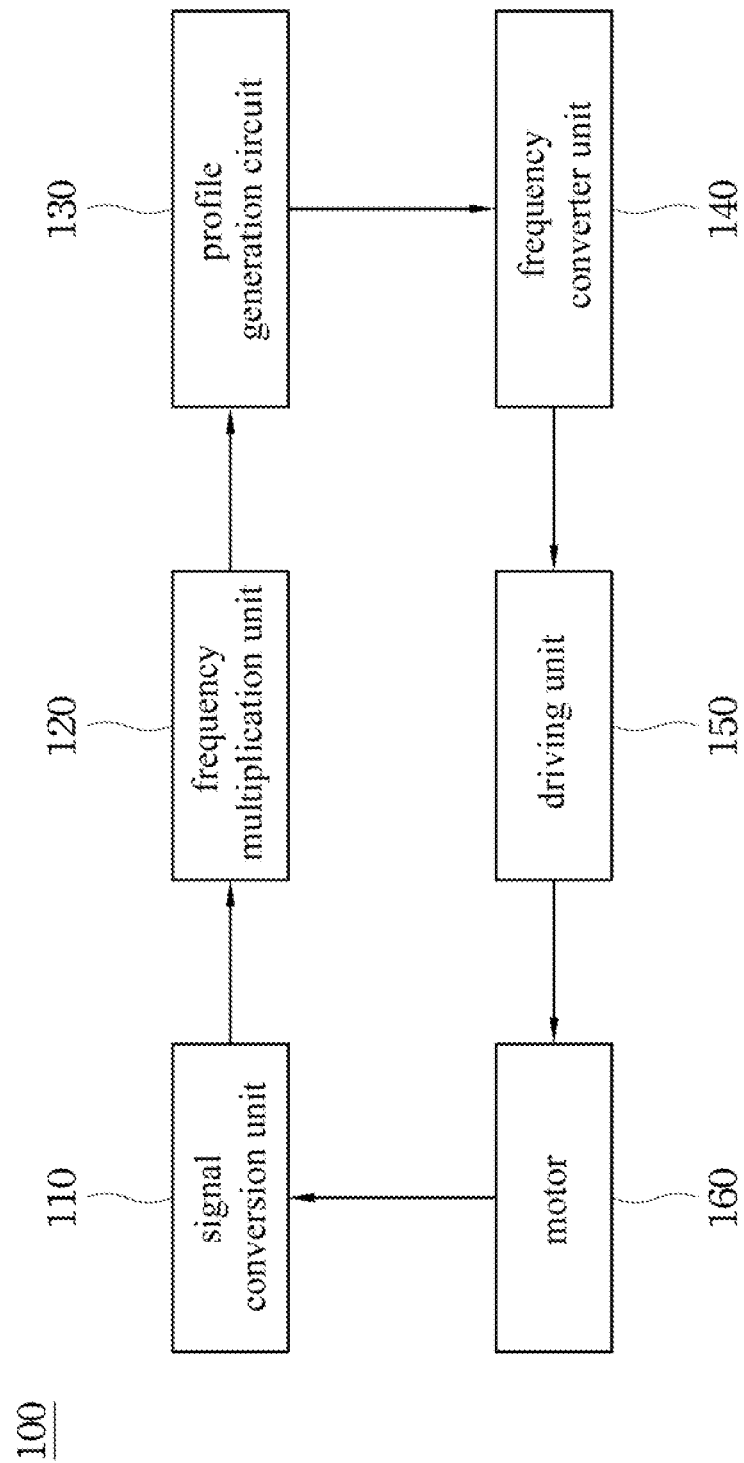
FIG. 1 is a block diagram of a motor control device according to one embodiment of the present disclosure.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one aspect, the present disclosure is directed to a motor control device. This device may be easily inserted into a fan motor and may be applicable or readily adaptable to all technologies. It should be noted that the motor control device operates on the basis of square waves to achieve a simple and accurate logical process. Herewith the motor control device is illustrated by reference to the following description considered in FIGS. 1-12.

FIG. 1 is a block diagram of a motor control device 100 according to one embodiment of the present disclosure. As shown in FIG. 1, the motor control device 100 includes a signal conversion unit 110, a frequency multiplication unit 120, a profile generation circuit 130, a frequency converter unit 140 and a driving unit 150. The signal conversion unit 110 receives a rotation speed signal from a motor 160 and converts the rotation speed signal into a digital signal. The frequency multiplication unit 120 generates a frequency multiplication signal based on the digital signal, so as to improve a resolution for subsequent processes. The profile generation circuit 130 performs frequency division on the frequency multiplication signal to get a profile signal. The frequency converter unit 140 generates a reference signal (e.g., a high-frequency reference signal) and compares the reference signal with the profile signal to output a motor control signal. The driving unit 150 drives the motor 160 according to the motor control signal.

Figure 10:
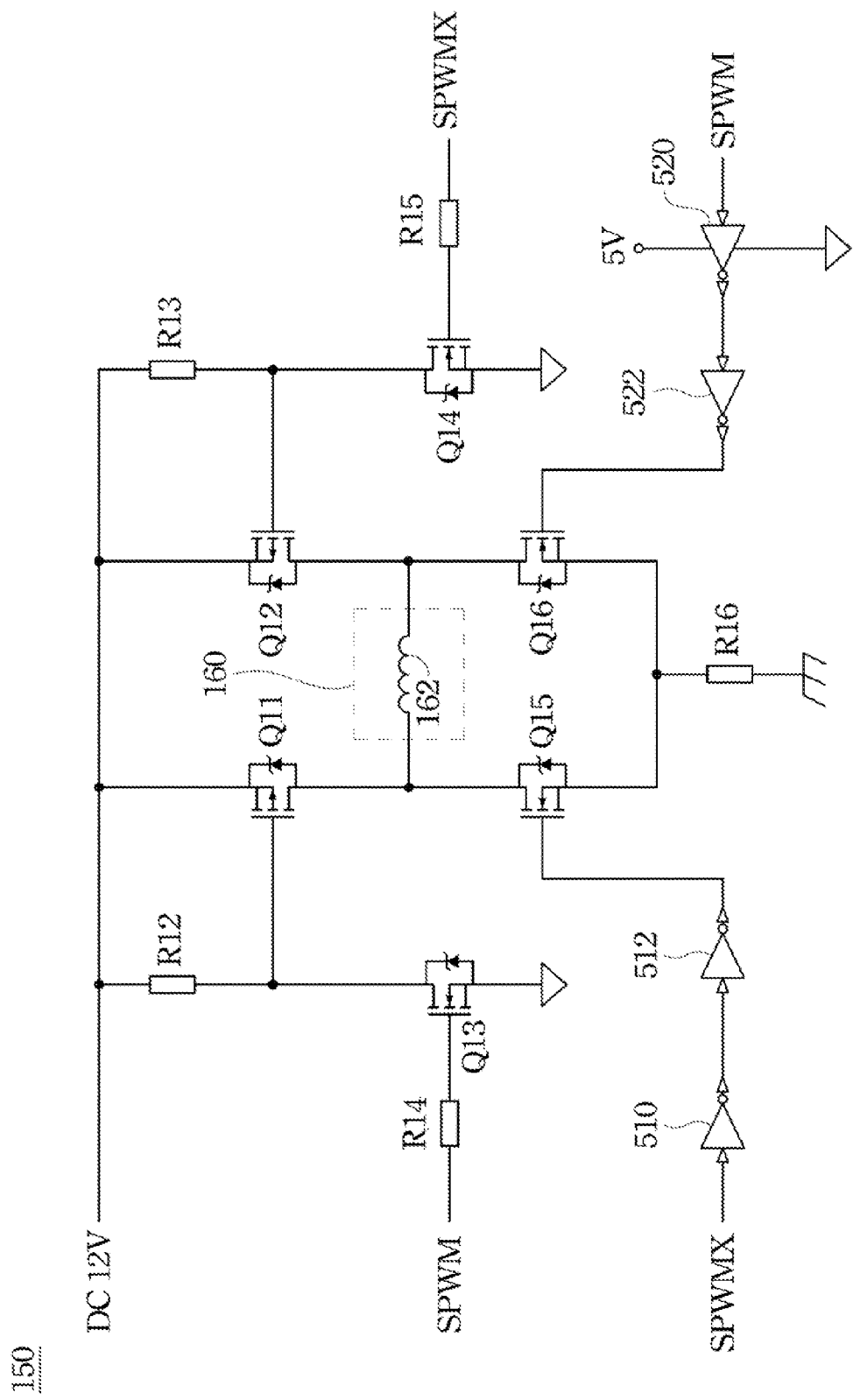
FIG. 10 is a circuit diagram of a driving unit according to one embodiment of the present disclosure.

In practice, the signal conversion unit 110 requires the rotation speed signal from north and south magnetic poles or a coil of the motor 160, and then converts the rotation speed signal into a digital signal that has high and low logic levels. In one embodiment, the motor 160 has a coil 162 as shown in FIG. 10.

Figure 2:
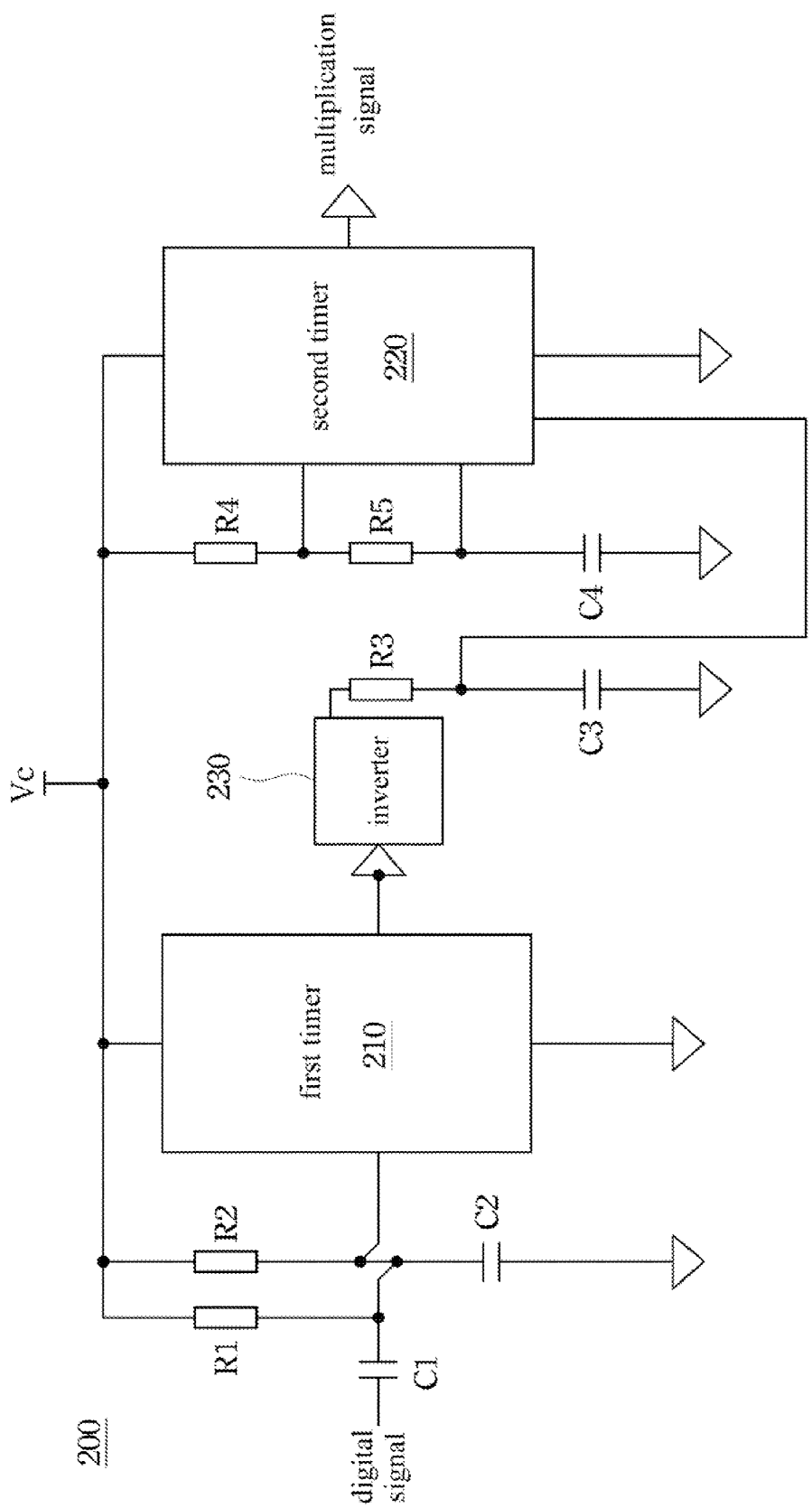
FIG. 2 is a circuit block diagram of a frequency multiplication unit according to one embodiment of the present disclosure.

The frequency multiplication unit 120 includes at least one frequency multiplier 200 as shown in FIG. 2. The frequency multiplier 200 sets a frequency of the frequency multiplication signal according to rotations per minute (RPM) of the motor 160 and further output the frequency multiplication signal, in which RPM=60/ST, where T is a cycle period, and S is the number of cycles per rotation. In practice, one rotation of a 4 pole 4 slot motor takes 2 periods; one rotation of an 8 pole 8 slot motor takes 4 periods. For example, the RPM of the 8 pole 8 slot motor=60/4T=15T, and therefore the frequency of the frequency multiplication signal is 15 times greater than the frequency of the digital signal. Similarly, the RPM of the 4 pole 4 slot motor=60/2T=30T, and therefore the frequency of the frequency multiplication signal is 30 times greater than the frequency of the digital signal.

In FIG. 2, the frequency multiplier 200 includes a first timer 210, a second timer 220, an inverter 230, a first resistor R1, a second resistor R2, a third resistor R3, a fourth resistor R4, a fifth resistor R5, a first capacitor C1, a second capacitor C2, a third capacitor C3, and a fourth capacitor C4.

The first timer 210 is configured to receive a working voltage Vc, and the first timer 210 has an input terminal and an output terminal. The first resistor R1 has a terminal configured to receive the working voltage and another terminal connected to the input terminal of the first timer 210. The first capacitor C1 has a terminal for receiving the digital signal and another terminal connected to the input terminal of the first timer 210. The second resistor R2 has a terminal configured to receive the working voltage Vc and another terminal connected to the input terminal of the first timer 210. The second capacitor C2 has a terminal connected to the input terminal of the first timer 210 and another terminal that is grounded. The inverter 230 has an input terminal connected to the output terminal of the first timer 210. The third resistor R3 has a terminal connected to an output terminal of the inverter 230. The third capacitor C3 has a terminal that is grounded and another terminal connected to another terminal of the third resistor R3. The second timer 220 is configured to receive the working voltage Vc and the second timer 220 has an input terminal and an output terminal. The fourth resistor R4, the fifth resistor R5, the fourth capacitor C4 are connected in series and coupled to the second timer 220. The input terminal of the second timer 220 is connected to another terminal of the third capacitor C3, and the output terminal of the second timer 212 is configured to output the frequency multiplication signal to the profile generation circuit 130.

The profile generation circuit 130 performs the frequency division to regenerate a synchronal rotation speed signal for getting the profile signal. In one embodiment, the profile signal is a sinusoidal digital signal or a sinusoidal-like digital signal with at least 4-bit long. In practice, if the sinusoidal digital signal or the sinusoidal-like digital signal were less than 4 bits, it would be difficult to synthesize a completed sinusoidal or sinusoidal-like waveform; therefore, 4 or more bits should be needed to synthesize a relatively completed sinusoidal or sinusoidal-like waveform.

Figure 3:
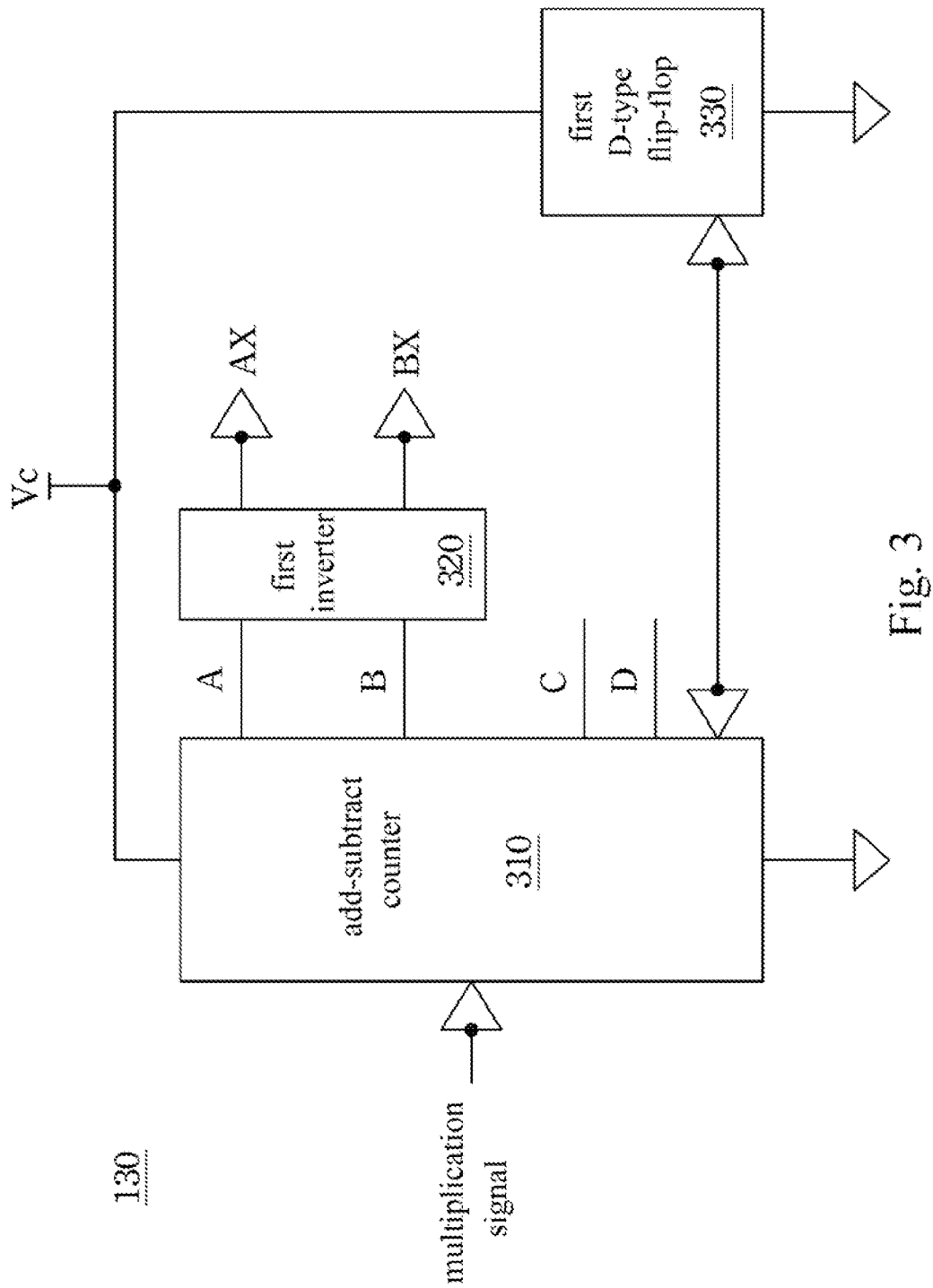
FIG. 3 is a circuit block diagram of an anterior segment of a profile generation circuit according to one embodiment of the present disclosure.
Figure 4:
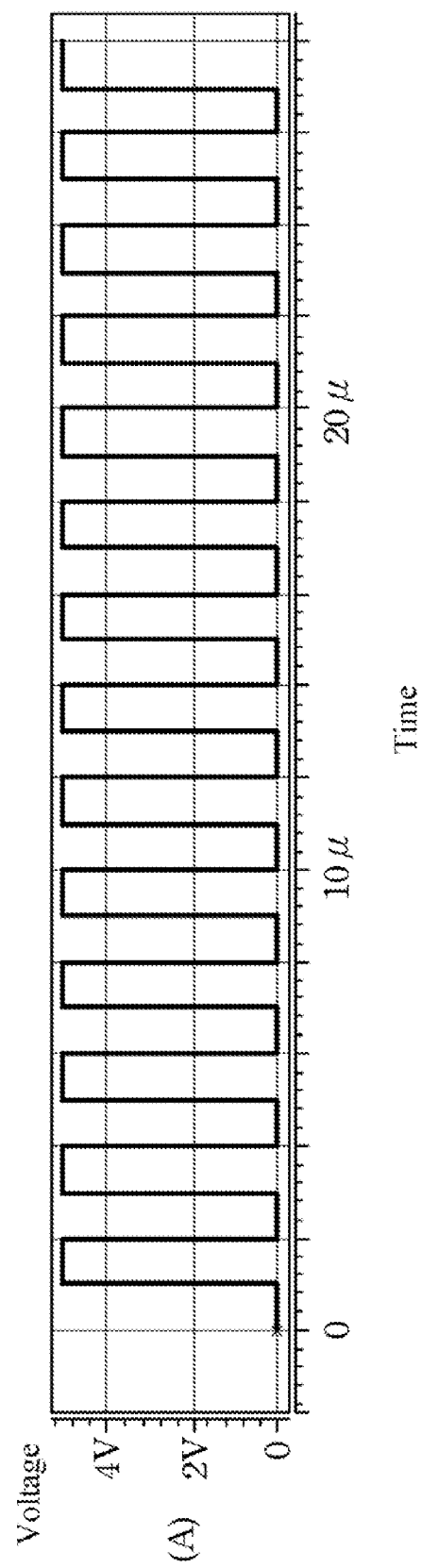
FIGS. 4-7 are waveform diagrams of output signals according to one embodiment of the present disclosure.
Figure 5:
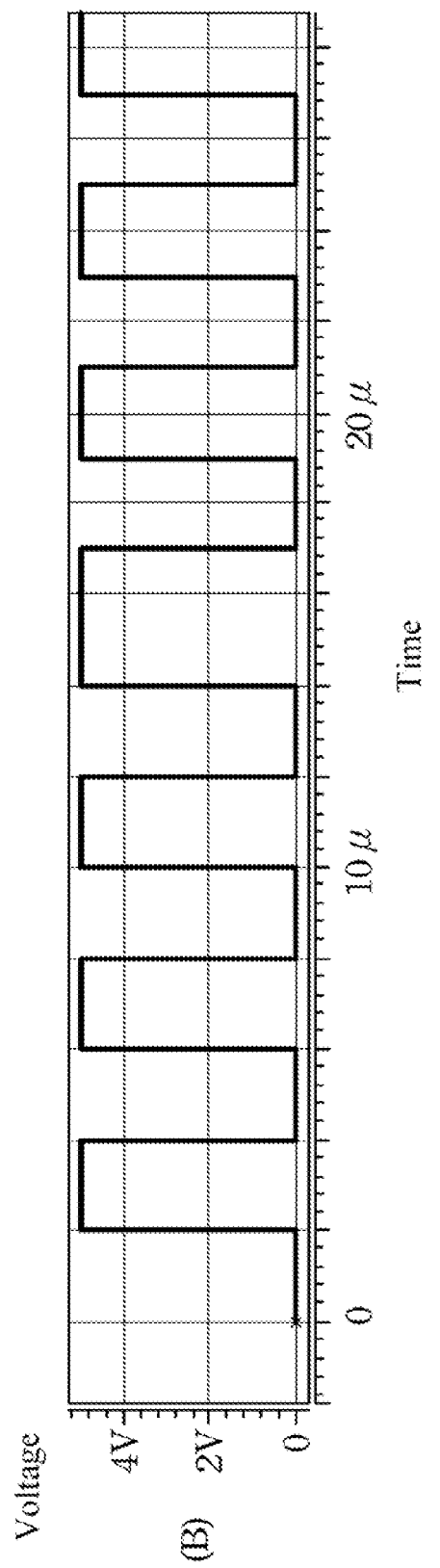
Figure 6:
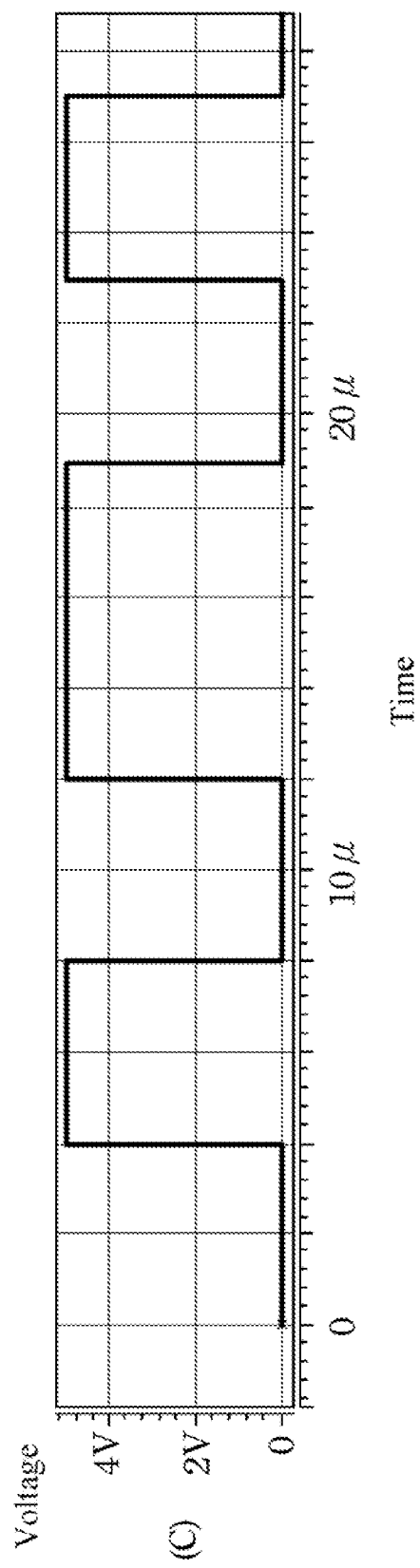
Figure 7:
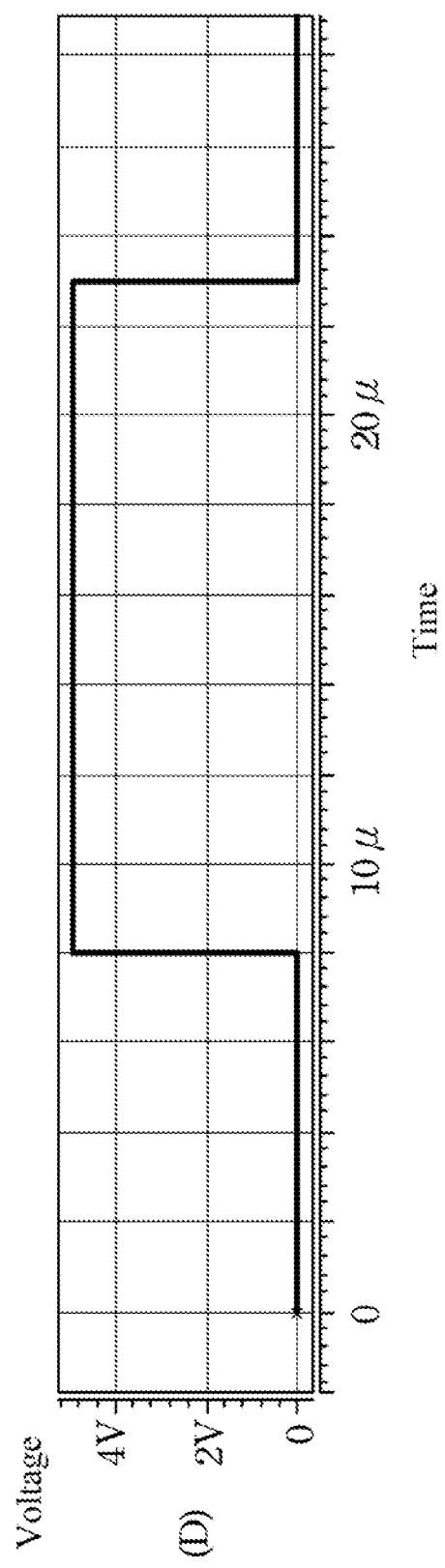

FIG. 3 is a circuit block diagram of an anterior segment of a profile generation circuit 130 according to one embodiment of the present disclosure. As shown in FIG. 3, the profile generation circuit 130 includes an add-subtract counter 310, a first inverter 320 and a first D-type flip-flop 330.

The first inverter 320 is connected to the add-subtract counter 310, and the add-subtract counter 310 is connected to the first D-type flip-flop 330. In use, the frequency multiplication signal that is outputted by the frequency multiplication unit 120 serves as an input signal for the add-subtract counter 310, and therefore the add-subtract counter 310 receives the frequency multiplication signal.

The first D-type flip-flop 330 controls operation of the add-subtract counter 310, so that the add-subtract counter 310 can output a first output signal A, a second output signal B, a third output signal C and a fourth output signal D. FIGS. 4-7 are waveform diagrams of output signals A-D. The first inverter 320 receives the first output signal A and the second output signal B and outputs a first inverted output signal AX and a second inverted output signal BX.

Figure 8:
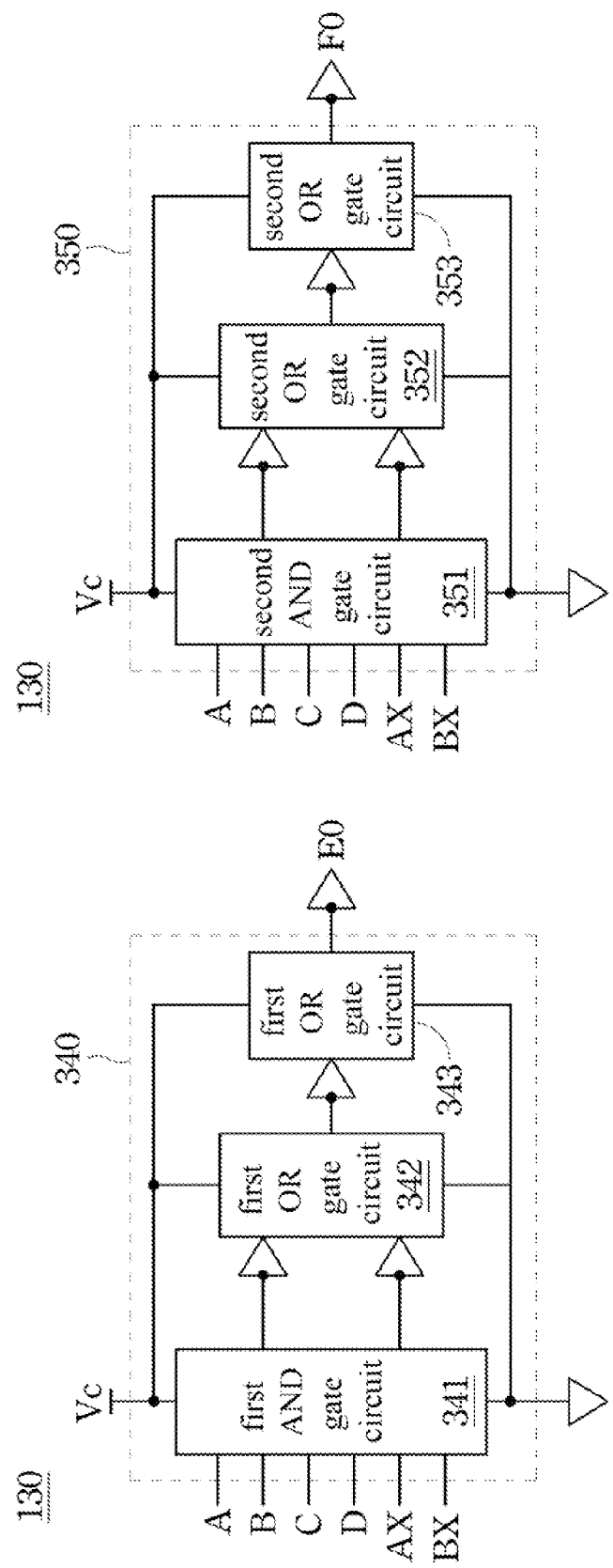
FIG. 8 is a circuit block diagram of a posterior segment of a profile generation circuit according to one embodiment of the present disclosure.

FIG. 8 is a circuit block diagram of a posterior segment of the profile generation circuit 130 according to one embodiment of the present disclosure. As shown in FIG. 8, the profile generation circuit 130 further includes a first logic gate circuit 340 and a second logic gate circuit 350. In use, the first output signal A, the second output signal B, the third output signal C, the fourth output signal D, the first inverted output signal AX and the second inverted output signal BX outputted by above anterior circuit as shown in FIG. 3 serve as input signals for the first logic gate circuit 340, and then the first logic gate circuit 340 performs a first logic operation based on the first, second, third and fourth output signals A-D and the first and second inverted output signals AX and BX so as to output a fifth output signal E0.

Similarly, the first output signal A, the second output signal B, the third output signal C, the fourth output signal D, the first inverted output signal AX and the second inverted output signal BX outputted by above anterior circuit as shown in FIG. 3 also serve as input signals for the second logic gate circuit 350, and then the second logic gate circuit 350 performs a second logic operation based on the first, second, third and fourth output signals and the first and second inverted output signals so as to output a sixth output signal F0.

In this embodiment, the second output signal B, the fourth output signal D, the fifth output signal E0 and the sixth output signal F0 serve as the sinusoidal digital signal or the sinusoidal-like digital signal with aforesaid at least 4-bit long. For example, a sinusoidal wave is provided, and it can be deduced form the following Table 1 that combination and permutation of logic gates are determined according to the variable Z. In Table 1, X represents the field number. In addition, another waveform also can be deduced in the similar manner.

TABLE 1

| X | D | C | B | A | Z | $2^3(D)$ | $2^2(F0)$ | $2^1(E0)$ | $2^0(B)$ |
|---|---|---|---|---|---|---|---|---|---|
| 0 | 0 | 0 | 0 | 0 | 0 | 0 | 0 | 0 | 0 |
| 1 | 0 | 0 | 0 | 1 | 0 | 0 | 0 | 0 | 0 |
| 2 | 0 | 0 | 1 | 0 | 1 | 0 | 0 | 0 | 1 |
| 3 | 0 | 0 | 1 | 1 | 1 | 0 | 0 | 0 | 1 |
| 4 | 0 | 1 | 0 | 0 | 2 | 0 | 0 | 1 | 0 |
| 5 | 0 | 1 | 0 | 1 | 4 | 0 | 1 | 0 | 0 |
| 6 | 0 | 1 | 1 | 0 | 5 | 0 | 1 | 0 | 1 |
| 7 | 0 | 1 | 1 | 1 | 7 | 0 | 1 | 1 | 1 |
| 8 | 1 | 0 | 0 | 0 | 8 | 1 | 0 | 0 | 0 |
| 9 | 1 | 0 | 0 | 1 | 10 | 1 | 0 | 1 | 0 |
| 10 | 1 | 0 | 1 | 0 | 11 | 1 | 0 | 1 | 1 |
| 11 | 1 | 0 | 1 | 1 | 13 | 1 | 1 | 0 | 1 |
| 12 | 1 | 1 | 0 | 0 | 14 | 1 | 1 | 1 | 0 |
| 13 | 1 | 1 | 0 | 1 | 14 | 1 | 1 | 1 | 0 |
| 14 | 1 | 1 | 1 | 0 | 15 | 1 | 1 | 1 | 1 |
| 15 | 1 | 1 | 1 | 1 | 15 | 1 | 1 | 1 | 1 |

In FIG. 8, the first logic gate circuit 340 includes a first AND gate circuit 341 and first OR gate circuits 342 and 343. The first AND gate circuit 341 receives the first output signal A, the second output signal B, the third second output signal C and the fourth output signal D, the first inverted output signal AX and the second inverted output signal BX. The first OR gate circuits 342 and 343 are connected to the first AND gate circuit 341. The first logic operation is performed by the combination and permutation of logic gates of circuits 341, 342 and 343 to output the fifth output signal E0.

In addition, the second logic gate circuit 350 includes a second AND gate circuit 351 and second OR gate circuits 352 and 353. The second AND gate circuit 351 receives the first output signal A, the second output signal B, the third second output signal C and the fourth output signal D, the first inverted output signal AX and the second inverted output signal BX. The second OR gate circuits 352 and 353 are connected to the first AND gate circuit 351. The second logic operation is performed by the combination and permutation of logic gates of circuits 351, 352 and 353 to output the sixth output signal F0.

In this embodiment, the first logic operation performed by the first logic gate circuit 340 is different from the second logic operation performed by the second logic gate circuit 350, so that the fifth output signal E0 can be different from the sixth output signal F0.

Figure 9:
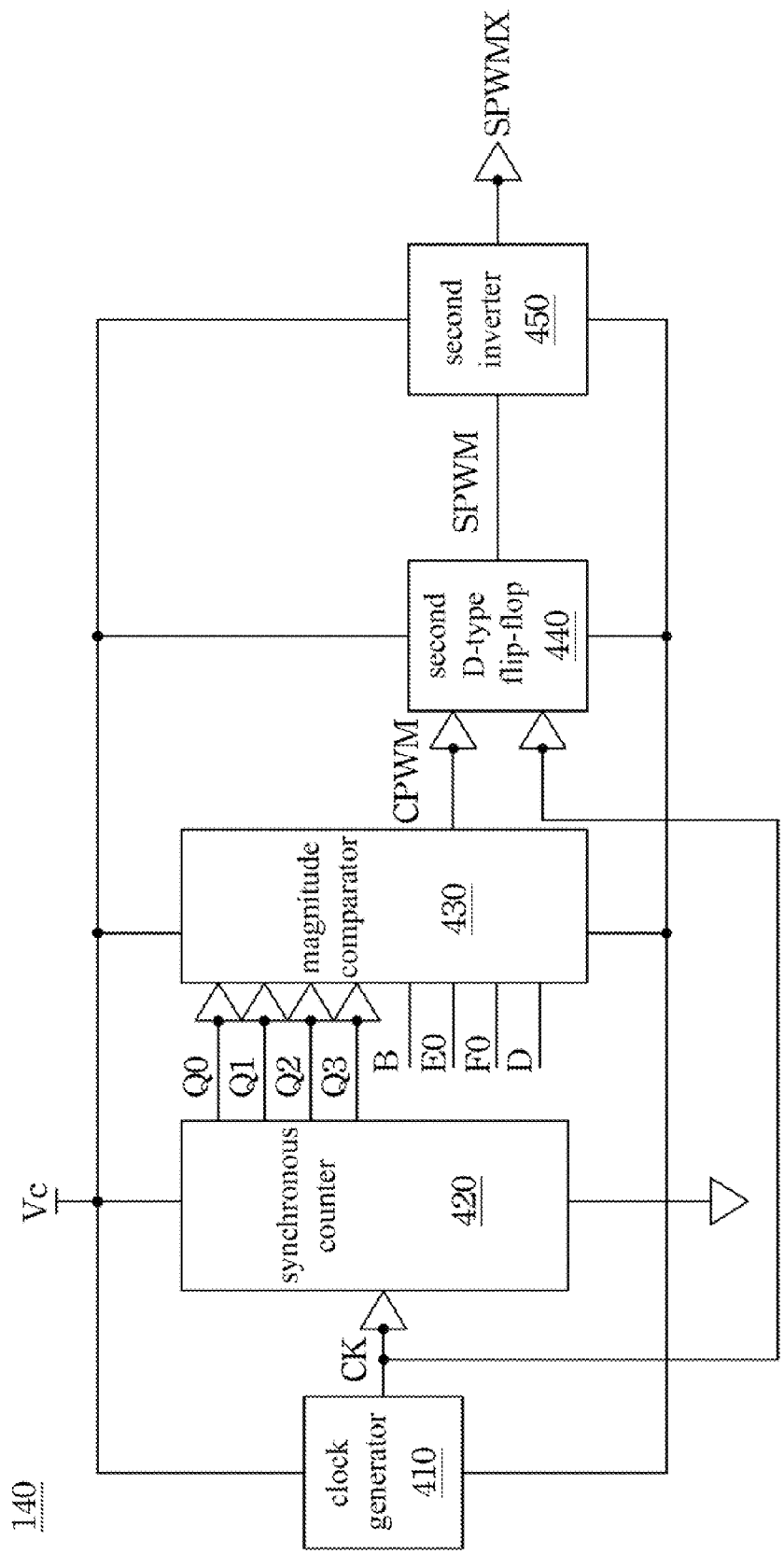
FIG. 9 is block diagram of a frequency converter unit according to one embodiment of the present disclosure.
Figure 11:
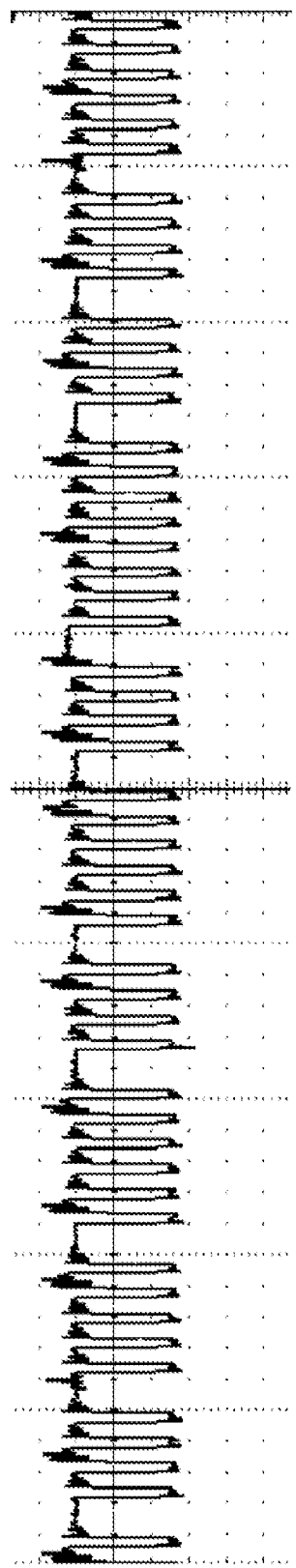
FIG. 11 is a waveform diagram of a sinusoidal PWM signal according to one embodiment of the present disclosure.
Figure 12:
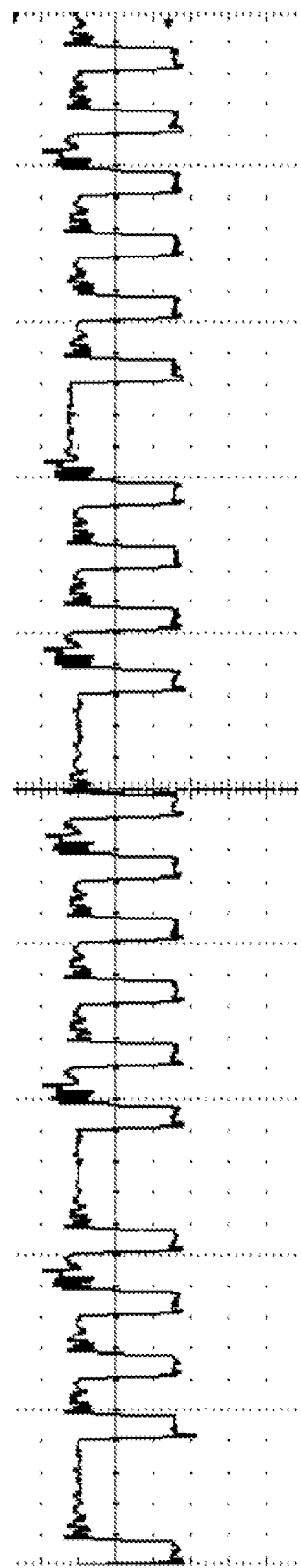
FIG. 12 is a waveform diagram of a sinusoidal PWM signal according to another embodiment of the present disclosure.

Then, the sinusoidal digital signal or the sinusoidal-like digital signal with aforesaid at least 4-bit long (i.e. the second output signal B, the fourth output signal D, the fifth output signal E0 and the sixth output signal F0) is outputted to the frequency converter unit 140. FIG. 9 is block diagram of a frequency converter unit 140 according to one embodiment of the present disclosure. As shown in FIG. 9, the frequency converter unit 140 includes a clock generator 410, a synchronous counter 420, a magnitude comparator 430, a second D-type flip-flop 440 and a second inverter 450. In use, the clock generator 410 generates a clock signal CK. The synchronous counter 420 generates four counter output signals Q0, Q1, Q2 and Q3 based on the clock signal CK, in which these counter output signals Q0, Q1, Q2 and Q3 serve as aforesaid reference signal. The magnitude comparator 430 performs a comparison operation based on the counter output signals Q0-Q3 and the second output signal B, the fourth output signal D, the fifth output signal E0 and the sixth output signal F0 so as to output a co-sinusoidal PWM signal (CPWM). The second D-type flip-flop 440 outputs a sinusoidal PWM signal (SPWM) according to the co-sinusoidal PWM signal (CPWM) and the clock signal CK; waveforms of the sinusoidal PWM signals are shown in FIGS. 11 and 12 respectively. The second inverter 450 receives the sinusoidal PWM signal (SPWM) and outputs an inverted sinusoidal PWM signal (SPWMX).

In FIG. 9, the clock generator 410 can be an inverting Schmitt rigger for generating an oscillation frequency as the clock signal CK.

FIG. 10 is a circuit diagram of a driving unit 150 according to one embodiment of the present disclosure, in which the sinusoidal PWM signal (SPWM) and the inverted sinusoidal PWM signal (SPWMX) serve as aforesaid motor control signal. As shown in FIG. 10, the driving unit 150 is a H-bridge driver circuit. The H-bridge driver circuit includes inverters 510, 512, 520 and 522, transistors Q11-Q16, and resistors R12-R16. The inverters 510 and 512 can output the inverted sinusoidal PWM signal (SPWMX) to the transistor Q13. The inverters 520 and 522 can output the sinusoidal PWM signal (SPWM) to the transistor Q16. The operation of the motor 160 can be controlled by the on/off state of the transistors Q11, Q12, Q15 and Q16.

In an alternative embodiment, the driving unit 150 can be another conventional or future-developed motor driver circuit. Those with ordinary skill in the art may choose a specific circuit structure of the driving unit 150 depending on the desired application.

In another aspect, the present disclosure is directed to a motor control method. The motor control method includes steps: (a) receiving a rotation speed signal from a motor and converting the rotation speed signal into a digital signal; (b) generating a frequency multiplication signal based on the digital signal; (c) performing frequency division on the frequency multiplication signal to get a profile signal; (d) generating a reference signal and comparing the reference signal with the profile signal to output a motor control signal; and (e) driving the motor 160 according to the motor control signal.

In the step (a), the rotation speed signal is required from north and south magnetic poles or a coil of the motor 160. In the step (b), a frequency of the frequency multiplication signal is set according to rotations per minute (RPM) of the motor 160, and the frequency multiplication signal is outputted.

In the step (c), the profile signal is a sinusoidal digital signal or a sinusoidal-like digital signal with at least 4-bit long. Specifically, in the step (c), the add-subtract counter 310 is controlled so that the add-subtract counter outputs a first output signal A, a second output signal B, a third output signal C and a fourth output signal D; the first output signal A and the second output signal B are inverted to output a first inverted output signal AX and a second inverted output signal BX; a first logic operation based on the first, second, third and fourth output signals A, B, C and D and the first and second inverted output signals AX and BX is performed so as to output a fifth output signal E0; a second logic operation based on the first, second, third and fourth output signals A, B, C and D and the first and second inverted output signals AX and BX is performed so as to output a sixth output signal F0, where the second, fourth, fifth and sixth output signals B, D, E0 and F0 serve as the sinusoidal digital signal or the sinusoidal-like digital signal with said at least 4-bit long.

In the step (d), a clock signal CK is generated, for example, an inverting Schmitt trigger is utilized to generate an oscillation frequency as the clock signal; then, four counter output signals Q0-Q3 based on the clock signal CK are generated, in which these counter output signals Q0-Q3 serve as the reference signal; then, a comparison operation based on the counter output signals Q0-Q3 and the second, fourth, fifth and sixth output signals B, D, E0 and F0 is performed so as to output a co-sinusoidal PWM signal (CPWM); a sinusoidal PWM signal (SPWM) is outputted according to the co-sinusoidal PWM signal (CPWM) and the clock signal CK, in which waveforms of the sinusoidal PWM signals are shown in FIGS. 11 and 12; then, the sinusoidal PWM signal (SPWM) is inverted to output an inverted sinusoidal PWM signal (SPWMX), wherein, for example, the sinusoidal PWM signal (SPWM) and the inverted sinusoidal PWM signal (SPWMX) serve as the motor control signal.

In the motor control method, the steps are not recited in the sequence in which the steps are performed. That is, unless the sequence of the steps is expressly indicated, the sequence of the steps is interchangeable, and all or part of the steps may be simultaneously, partially simultaneously, or sequentially performed. It should be noted that those implements to perform the steps in the motor control method are disclosed in above embodiments and, thus, are not repeated herein.

The readers attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. A motor control device comprising:
   a signal conversion unit for receiving a rotation speed signal from a motor and for converting the rotation speed signal into a digital signal;
   a frequency multiplication unit for generating a frequency multiplication signal based on the digital signal;
   a profile generation circuit for performing frequency division on the frequency multiplication signal to get a profile signal; and
   a frequency converter unit for generating a reference signal and for comparing the reference signal with the profile signal to output a motor control signal.

2. The motor control device of claim 1, wherein the signal conversion unit requires the rotation speed signal from north and south magnetic poles or a coil of the motor.

3. The motor control device of claim 1, wherein the frequency multiplication unit comprises:
   at least one frequency multiplier for setting a frequency of the frequency multiplication signal according to rotations per minute of the motor and further for outputting the frequency multiplication signal.

4. The motor control device of claim 3, wherein the frequency multiplier comprises:
   a first timer configured to receive a working voltage, the first timer having an input terminal and an output terminal;
   a first resistor having a terminal configured to receive the working voltage and another terminal connected to the input terminal of the first timer;
   a first capacitor having a terminal for receiving the digital signal and another terminal connected to the input terminal of the first timer;
   a second resistor having a terminal configured to receive the working voltage and another terminal connected to the input terminal of the first timer;
   a second capacitor having a terminal connected to the input terminal of the first timer and another terminal that is grounded;
   an inverter having an input terminal connected to the output terminal of the first timer;
   a third resistor having a terminal connected to an output terminal of the inverter;
   a third capacitor having a terminal that is grounded and another terminal connected to another terminal of the third resistor; and
   a second timer configured to receive the working voltage, the second timer having an input terminal and an output terminal, the input terminal of the second timer connected to another terminal of the third capacitor, the output terminal of the second timer configured to output the frequency multiplication signal.

5. The motor control device of claim 1, wherein the profile signal is a sinusoidal digital signal or a sinusoidal-like digital signal with at least 4-bit long.

6. The motor control device of claim 5, wherein the profile generation circuit comprises:
   an add-subtract counter for receiving the frequency multiplication signal;
   a first D-type flip-flop for controlling the add-subtract counter, so that the add-subtract counter outputs a first output signal, a second output signal, a third output signal and a fourth output signal;

a first inverter for receiving the first output signal and the second output signal and for outputting a first inverted output signal and a second inverted output signal;

to a first logic gate circuit for performing a first logic operation based on the first, second, third and fourth output signals and the first and second inverted output signals so as to output a fifth output signal; and a second logic gate circuit for performing a second logic operation based on the first, second, third and fourth output signals and the first and second inverted output signals so as to output a sixth output signal, wherein the second, fourth, fifth and sixth output signals serve as the sinusoidal digital signal or the sinusoidal-like digital signal with said at least 4-bit long.

7. The motor control device of claim 6, wherein the first logic gate circuit comprises:
a first AND gate circuit for receiving the first, second, third and fourth output signals and the first and second inverted output signals; and
at least one first OR gate circuit connected to the first AND gate circuit for outputting the fifth output signal.

8. The motor control device of claim 6, wherein the second logic gate circuit comprises:
a second AND gate circuit for receiving the first, second, third and fourth output signals and the first and second inverted output signals; and
at least one second OR gate circuit connected to the first AND gate circuit for outputting the sixth output signal.

9. The motor control device of claim wherein the frequency converter unit comprises:
a clock generator for generating a clock signal;
a synchronous counter for generating four counter output signals based on the clock signal, the counter output signals serving as the reference signal;
a magnitude comparator for performing a comparison operation based on the counter output signals and the second, fourth, fifth and sixth output signals so as to output a co-sinusoidal PWM signal;
a second D-type flip-flop for outputting a sinusoidal PWM signal according to the co-sinusoidal PWM signal and the clock signal; and
a second inverter for receiving the sinusoidal PWM signal and outputting an inverted sinusoidal PWM signal, wherein the sinusoidal PWM signal and the inverted sinusoidal. PWM signal serve as the motor control signal.

10. The motor control device of claim 9, wherein the clock generator is an inverting Schmitt trigger for generating an oscillation frequency as the clock signal.

11. The motor control device of claim 1, further comprising:
a driving unit for driving the motor according to the motor control signal.

12. The motor control device of claim 11, wherein the driving unit is a H-bridge driver circuit.

13. A motor control method comprising:
(a) receiving a rotation speed signal from a motor and converting the rotation speed signal into a digital signal;
(b) generating a frequency multiplication signal based on the digital signal;

(c) performing frequency division on the frequency multiplication signal to get a profile signal; and
(d) generating a reference signal and comparing the reference signal with the profile signal to output a motor control signal.

14. The motor control method of claim 13, wherein the step (a) comprises:
requiring the rotation speed signal from north and south magnetic poles or a coil of the motor.

15. The motor control method of claim 13, wherein the step (b) comprises:
setting a frequency of the frequency multiplication signal according to rotations per minute of the motor and further outputting the frequency multiplication signal.

16. The motor control method of claim 13, wherein the profile signal is a sinusoidal digital signal or a sinusoidal-like digital signal with at least 4-bit long.

17. The motor control method of claim 16, wherein the step (c) comprises:
controlling an add-subtract counter, so that the add-subtract counter outputs a first output signal, a second output signal, a third output signal and a fourth output signal;
inverting the first output signal and the second output signal to output a first inverted output signal and a second inverted output signal;
performing a first logic operation based on the first, second, third and fourth output signals and the first and second inverted output signals so as to output a fifth output signal; and
performing a second logic operation based on the first, second, third and fourth output signals and the first and second inverted output signals so as to output a sixth output signal, wherein the second, fourth, fifth and sixth output signals serve as the sinusoidal digital signal or the sinusoidal-like digital signal with said at least 4-bit long.

18. The motor control method of claim 16, wherein the step (d) comprises:
generating a clock signal;
generating four counter output signals based on the clock signal, the counter output signals serving as the reference signal;
performing a comparison operation based on the counter output signals and the second, fourth, fifth and sixth output signals so as to output a co-sinusoidal PWM signal;
outputting a sinusoidal PWM signal according to the co-sinusoidal PWM signal and the clock signal; and
inverting the sinusoidal PWM signal to output an inverted sinusoidal PWM signal, wherein the sinusoidal PWM signal and the inverted sinusoidal PWM signal serve as the motor control signal.

19. The motor control method of claim 18, wherein the step of generating the clock signal comprises:
utilizing an inverting Schmitt trigger to generate an oscillation frequency as the clock signal.

20. The motor control method of claim 13, further comprising:
driving the motor according to the motor control signal.

* * * * *